Oct. 27, 1925.
W. C. McWHIRTER
AUTOMOTIVE BRAKE DEVICE
Filed Nov. 14, 1923
1,558,693
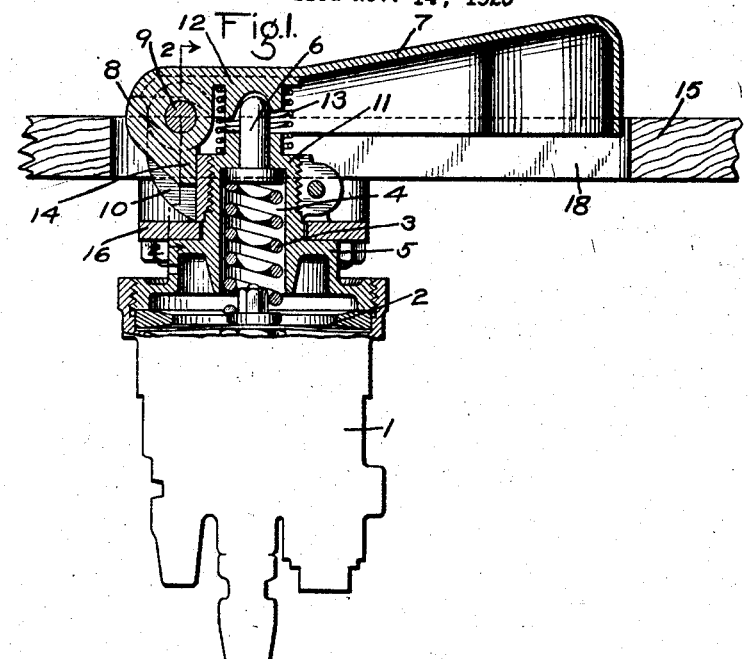
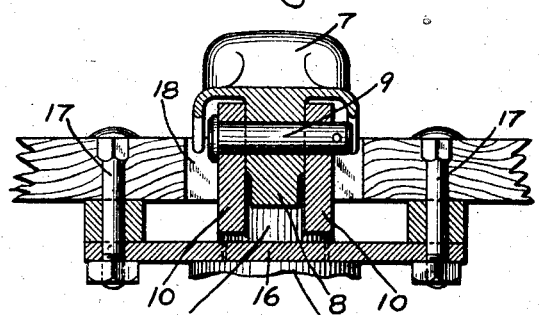
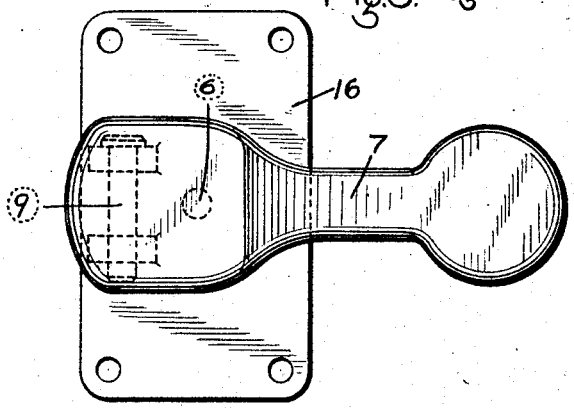
INVENTOR
WILLIAM C. McWHIRTER
BY *Wm. M. Cady*
ATTORNEY Patented Oct. 27, 1925.

1,558,693

UNITED STATES PATENT OFFICE.

WILLIAM C. McWHIRTER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE DEVICE.

Application filed November 14, 1923. Serial No. 674,668.

*To all whom it may concern:*

Be it known that I, WILLIAM C. McWHIRTER, a citizen of the United States, residing at Wilkinsburg, in the county of Allegheny and State of Pennsylvania, have invented new and useful Improvements in Automotive Brake Devices, of which the following is a specification.

This invention relates to brake controlling valve devices, and more particularly to a controlling valve device adapted for use on a motor vehicle.

The principal object of my invention is to provide an improved foot actuated means for operating a controlling valve device of the above character.

In the accompanying drawing; Fig. 1 is a side elevation, partly in section, of a brake controlling valve device, showing my improved foot actuated means applied thereto; Fig. 2 a section on the line 2—2 of Fig. 1; and Fig. 3 a plan view of the construction shown in Fig. 1.

The brake controlling valve device 1, as shown in the drawing, comprises a casing containing a flexible diaphragm 2 adapted to control the operation of a fluid pressure supply valve and an exhaust valve (not shown), said diaphragm being subject to the pressure of a coil spring 3, so that when the spring 3 is compressed, the diaphragm 2 is operated to close the exhaust valve and to open the fluid supply valve and when the spring is relieved of pressure, the diaphragm is operated to permit the fluid supply valve to close and the exhaust valve to open.

The spring 3 is mounted in a central chamber 4 of the cap plate 5 and a movable member 6 is mounted in said chamber so as to engage the upper end of the spring 3, said member extending through an opening in the cap plate 5, so as to be engaged by a pedal or foot operated lever 7.

The pedal 7 is provided at one end with a depending lug 8 which is pivotally mounted on a pin 9 between lugs 10 carried by a sleeve 11. The sleeve 11 has screw-threaded engagement on the central upwardly extending portion of the cap plate 5.

Within the hollow of the pedal 7 and adjacent to the spring pin 6, the pedal is provided with a boss 12 having a recess for receiving the rounded end of the pin 6. A spring 13 is interposed between the pedal 7 and the sleeve 11 for maintaining the pedal 7 in release position.

The lug 8 may be provided with a depending portion 14 adapted to engage the sleeve 11 for the purpose of limiting the upward movement of the pedal 7.

The controlling valve device 1 is secured underneath the floor board 15 of the motor vehicle by means of a plate 16 which is clamped between a shoulder of the cap plate 5 and the sleeve 11 when said sleeve is screwed down. The plate 16 is secured to the floor board 15 by bolts 17, a portion of the controlling valve device including the pedal 7 extending through an opening 18 in the floor 15, as shown in the drawing.

When the pedal 7 is depressed by the foot, the pin 6 is operated to compress the spring 3 and the diaphragm 2 is moved so as to open the fluid supply valve of the controlling valve device to supply fluid for applying the brakes, at the same time closing the exhaust valve. When the pedal 7 is relieved of foot pressure, the diaphragm moves upwardly, permitting the supply valve to close and the exhaust valve to open so as to release fluid to effect the release of the brakes.

The construction of the pedal 7 with a flanged contour, with the flange extending below the floor line, prevents obstructions, such as robes, clothing, and the like, from interfering with the desired movement of the pedal.

Having now described my invention, what I claim as new and desire to secure by Letters Patent, is:—

1. The combination with a brake controlling valve device having a flexible diaphragm, a spring acting on said diaphragm, and a movable member for compressing said spring, of a sleeve secured to said valve device and having lugs, and a pedal lever having a lug pivotally mounted between the lugs of the sleeve and provided with a boss having a recess for receiving the end of said movable member.

2. The combination with the floor board of a motor vehicle, of a brake controlling valve device secured to the under side of said floor and a foot pedal operatively connected to said valve device, said pedal having a flange at its edge portion which extends into an opening in the floor board.

In testimony whereof I have hereunto set my hand.

WILLIAM C. McWHIRTER.